(12) United States Patent
Oh et al.

(10) Patent No.: US 12,164,340 B2
(45) Date of Patent: Dec. 10, 2024

(54) DISPLAY DEVICE

(71) Applicant: Samsung Display Co., Ltd., Yongin-si (KR)

(72) Inventors: Young Eun Oh, Hwaseong-si (KR); Dongwoo Seo, Suwon-si (KR); Hung Kun Ahn, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 216 days.

(21) Appl. No.: 17/837,481

(22) Filed: Jun. 10, 2022

(65) Prior Publication Data
US 2023/0046978 A1    Feb. 16, 2023

(30) Foreign Application Priority Data
Jul. 29, 2021    (KR) .................. 10-2021-0099811

(51) Int. Cl.
*C08L 67/02*    (2006.01)
*C08L 75/04*    (2006.01)
*G06F 1/16*    (2006.01)

(52) U.S. Cl.
CPC ............ *G06F 1/1656* (2013.01); *C08L 67/02* (2013.01); *C08L 75/04* (2013.01); *G06F 1/1616* (2013.01)

(58) Field of Classification Search
CPC ........ G06F 1/1656; G06F 1/16; G06F 1/1616; G06F 1/1652; G06F 3/044; G06F 1/1641; G06F 1/1643; B32B 2457/20; B32B 2307/546

USPC ........................................ 361/56, 212, 220
See application file for complete search history.

(56) References Cited

U.S. PATENT DOCUMENTS

| | | | |
|---|---|---|---|
| 10,665,816 B2 | 5/2020 | Oh et al. | |
| 2018/0004254 A1* | 1/2018 | Park | G06F 1/1652 |
| 2019/0143638 A1 | 5/2019 | Park et al. | |
| 2021/0376268 A1* | 12/2021 | Shi | B32B 15/08 |
| 2022/0261039 A1* | 8/2022 | Zhang | G06F 3/0412 |

FOREIGN PATENT DOCUMENTS

| | | |
|---|---|---|
| EP | 3633004 A1 | 4/2020 |
| KR | 10-2017-0136033 A | 12/2017 |
| KR | 10-2019-0056474 A | 5/2019 |
| KR | 10-2040299 B1 | 11/2019 |

* cited by examiner

*Primary Examiner* — Danny Nguyen
(74) *Attorney, Agent, or Firm* — Lewis Roca Rothgerber Christie LLP

(57) ABSTRACT

A display device which includes a display panel and a protection member above the display panel. The protection member may include an adhesive layer above the display panel, a first protection layer above the adhesive layer, and a second protection layer between the first protection layer and the adhesive layer.
The first protection layer may have a first thickness and a first modulus, and the second protection layer may have a second thickness less than the first thickness and a second modulus less than the first modulus. The minimum value of the second thickness may be 20 μm, and the maximum value of the second thickness may satisfy $$T2_{max} = (0.13 \times T1 - 8.25) \times \ln M2 + 0.68 \times T1 - 5.1 \qquad (1)$$

21 Claims, 5 Drawing Sheets

DISPLAY DEVICE

CROSS-REFERENCE TO RELATED APPLICATION

The present application claims priority to and the benefit of Korean Patent Application No. 10-2021-0099811, filed on Jul. 29, 2021, the entire content of which is hereby incorporated by reference.

BACKGROUND

Aspects of some embodiments of the present disclosure herein relate to a display device.

Display devices provide users with information by displaying various images on a display screen. Generally, display devices display the information within an allocated screen. Recently, flexible display devices including a foldable and/or flexible display panel have been developed. Such a flexible display device may be folded, rolled, or bent, without damaging the integrity or functionality of the display device, as opposed to rigid display devices, which would generally be damaged by such motions or actions. The flexible display device deformable into various shapes may enable various screen sizes, and thus, the user convenience may be improved.

A protection member may be arranged or formed on the uppermost portion of the display device. The protection member may have impact resistance and reliability characteristics to protect the overall foldable flexible display device from damage.

The above information disclosed in this Background section is only for enhancement of understanding of the background and therefore the information discussed in this Background section does not necessarily constitute prior art.

SUMMARY

Aspects of some embodiments of the present disclosure herein relate to a display device, and for example, to a display device which includes a protection member arranged on a display panel.

Aspects of some embodiments of the present disclosure include a display device in which impact resistance and reliability are maintained.

According to some embodiments, a display device includes: a display panel which is foldable about at least one folding axis; and a protection member above the display panel, wherein the protection member includes: an adhesive layer located above the display panel; a first protection layer which is located above the adhesive layer, and has a first thickness and a first-first modulus at room temperature; and a second protection layer which is located between the adhesive layer and the first protection layer, and has a second thickness less than the first thickness and a second-first modulus less than the first-first modulus at room temperature, wherein the minimum value of the second thickness is about 20 μm, and the maximum value of the second thickness satisfies Equation (1) below:

$$T2_{max}=(0.13 \times T1-8.25) \times \ln M2+0.68 \times T1-5.1 \quad (1)$$

wherein in Equation (1), $T2_{max}$ is the maximum value of the second thickness, T1 is the first thickness, and M2 is a second-second modulus of the second protection layer at about 60° C.

According to some embodiments, moduli of the adhesive layer may be less than moduli of the first protection layer and moduli of the second protection layer at room temperature and about 60° C.

According to some embodiments, the second-first modulus of the second protection layer may be about 10 MPa to about 500 MPa, and the second-second modulus may be about 36 MPa to about 400 MPa.

According to some embodiments, the first-first modulus of the first protection layer may be about 4 GPa to about 5 GPa, and the first protection layer may have a first-second modulus at about 60° C., and the first-second modulus may be about 4.2 GPa to about 4.4 GPa.

According to some embodiments, a modulus of the adhesive layer at about 60° C. may be about 10 KPa to about 40 KPa, and a modulus at room temperature may be about 20 KPa to about 50 KPa.

According to some embodiments, a thickness of the adhesive layer may be about 35 μm to about 80 μm.

According to some embodiments, the first protection layer may include at least one of polyethylene terephthalate (PET), polybutylene terephthalate (PBT), polyethylene naphthalate (PEN), polycarbonate (PC), poly methyl methacrylate (PMMA), polystyrene (PS), polyvinyl chloride (PVC), polyethersulfone (PES), polyethylene (PE), polypropylene (PP), polyamide (PA), modified-polyphenylene oxide (m-PPO), polyoxymethylene (POM), polyarylsulfones (PSU), polyphenylene sulfide (PPS), polyimide (PI), polyethylenimine (PEI), polyether ether ketone (PEEK), polyamide-imide (PAI), or polyarylate (PAR).

According to some embodiments, the second protection layer may include at least one of thermoplastic polyurethane (TPU), thermoplastic polyester elastomer (TPEE), thermoplastic vulcanizate (TPV), thermoplastic olefin (TPO), thermoplastic starch (TPS), ethylene propylene rubber (EPDM), or polyether block amide (PEBA).

According to some embodiments, the first protection layer may include polyethylene terephthalate, and the second protection layer includes thermoplastic polyurethane.

According to some embodiments, the protection member may further include a functional layer located above the first protection layer, and the functional layer may include at least one of an anti-fingerprint layer or a hard coating layer.

According to some embodiments, a modulus of the functional layer at room temperature may be about 2 GPa to about 4 GPa.

According to some embodiments, a thickness of the functional layer may be about 5 μm to about 10 μm.

According to some embodiments, the protection member may further include an auxiliary adhesive layer located between the first protection layer and the second protection layer, and wherein moduli of the auxiliary adhesive layer are less than moduli of the first protection layer and moduli of the second protection layer at room temperature and about 60° C.

According to some embodiments, the moduli of the auxiliary adhesive layer may be greater than or equal to moduli of the adhesive layer at room temperature and about 60° C.

According to some embodiments, the first thickness of the first protection layer may be about 65 μm to about 100 μm.

According to some embodiments, the second thickness of the second protection layer may be about 20 μm to about 95 μm.

According to some embodiments, a thickness of the protection member may be about 200 μm to about 250 μm.

According to some embodiments of the inventive concept, a display device includes: a display panel which is foldable about at least one folding axis; and a protection member located above the display panel, wherein the protection member includes: a first protection layer which is located above the display panel, and has a first thickness and a first-first modulus at room temperature; a second protection layer which is located below the first protection layer, and has a second thickness less than the first thickness and a second-first modulus less than the first-first modulus at room temperature; and an adhesive layer which is located between the display panel and the second protection layer, and has a third-first modulus less than the second-first modulus at room temperature, wherein the minimum value of the second thickness is about 20 μm, and the maximum value of the second thickness satisfies Equation (1) below:

$$T2_{max}=(0.13\times T1-8.25)\times \ln M2+0.68\times T1-5.1 \qquad (1)$$

wherein in Equation (1), $T2_{max}$ is the maximum value of the second thickness, T1 is the first thickness, and M2 is a second-second modulus of the second protection layer at about 60° C.

According to some embodiments, a thickness of the protection member may be about 200 μm to about 250 μm, the first thickness of the first protection layer may be about 65 μm to about 100 μm, the second thickness of the second protection layer may be about 95 μm or less, and a thickness of the adhesive layer may be about 35 μm to about 80 μm.

BRIEF DESCRIPTION OF THE FIGURES

The accompanying drawings are included to provide a further understanding of embodiments according to the inventive concept, and are incorporated in and constitute a part of this specification. The drawings illustrate embodiments of the inventive concept and, together with the description, serve to explain characteristics of some embodiments of the inventive concept. In the drawings.

DETAILED DESCRIPTION

Figure 1A:
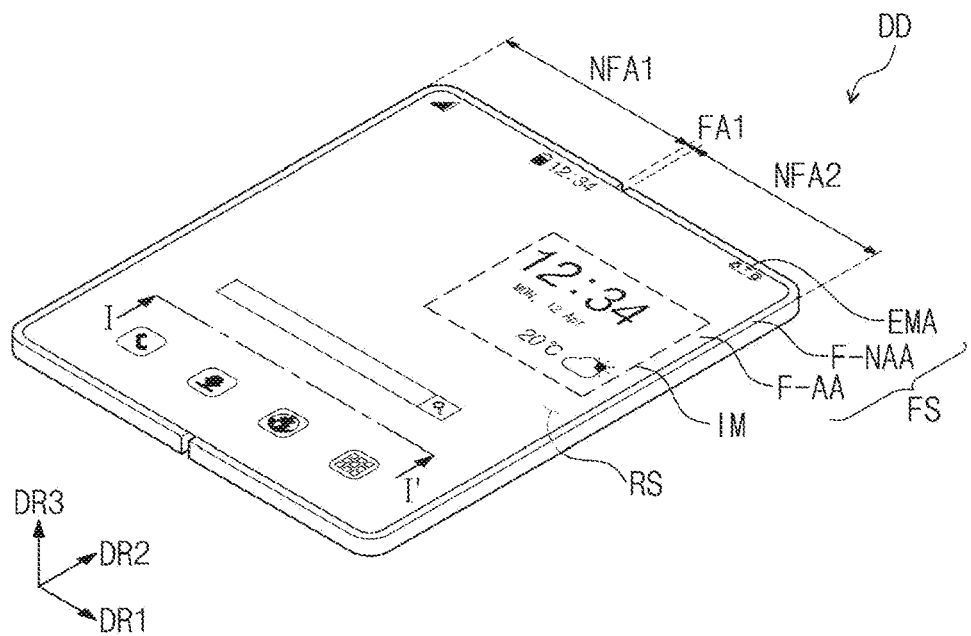
FIG. 1A is a perspective view showing a display device according to some embodiments.

In this specification, when an element (or a region, a layer, a portion, or the like) is referred to as "being on", "being connected to", or "being coupled to" another element, it may be directly located on/connected/coupled to another element, or an intervening third element may also be arranged therebetween.

Like numbers refer to like elements throughout. Also, in the drawings, the thicknesses, ratios, and dimensions of the elements are exaggerated for effective description of the technical contents. "And/or" includes one or more combinations which may be defined by the associated elements.

Although the terms first, second, etc. may be used to describe various elements, these elements should not be limited by these terms. These terms are only used to distinguish one element from another element. For example, a first element may be referred to as a second element, and similarly, a second element may also be referred to as a first element without departing from the scope of the present disclosure. The singular forms include the plural forms as well, unless the context clearly indicates otherwise.

Also, terms of "below", "on lower side", "above", "on upper side", or the like may be used to describe the relationships of the elements illustrated in the drawings. These terms have relative concepts and are described on the basis of the directions indicated in the drawings.

It will be understood that the term "includes" or "comprises", when used in this specification, specifies the presence of stated features, integers, steps, operations, elements, components, or a combination thereof, but does not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure belongs. Also, terms, such as those defined in commonly used dictionaries, should be interpreted as having a meaning that is consistent with their meaning in the context of the relevant art and should not be interpreted in an idealized or overly formal sense unless expressly so defined herein.

Figure 1B:
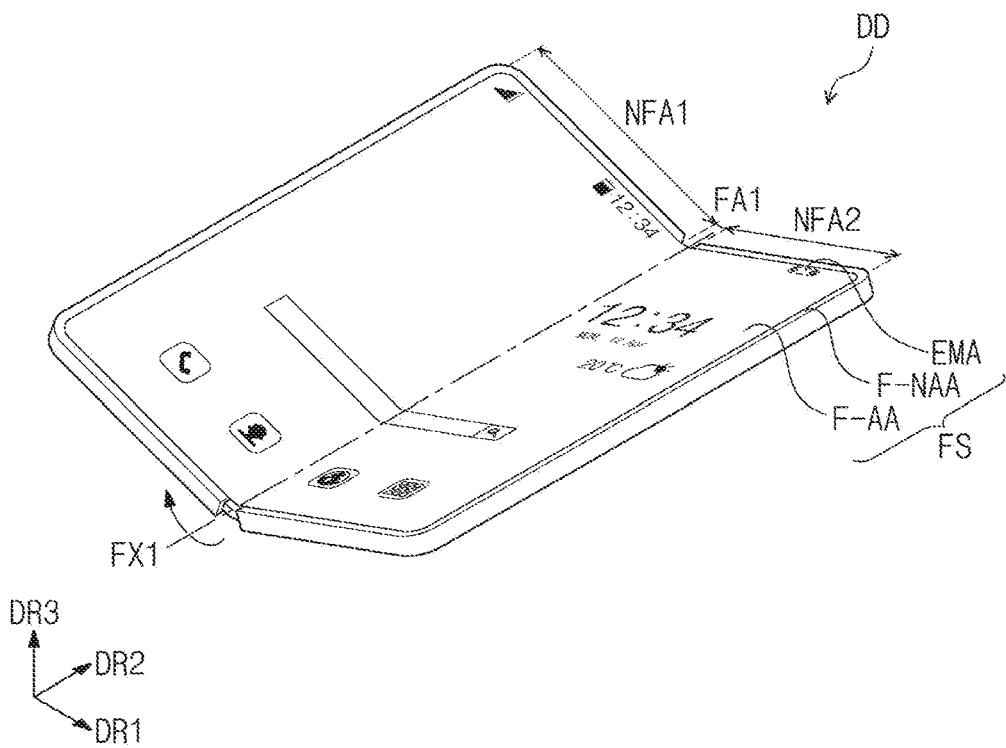
FIG. 1B is a perspective view showing a display device according to some embodiments.

Hereinafter, aspects of some embodiments of the inventive concept will be described in more detail with reference to the drawings. FIGS. 1A and 1B are perspective views showing a display device DD according to some embodiments.

A display device DD may be a device to be activated in response to an electrical signal. For example, the display device DD may be a personal digital terminal, a tablet PC, a vehicle navigation unit, a game console, or a wearable device, but the embodiments of the inventive concept are not limited thereto. In FIGS. 1A and 1B, the display device DD is illustrate as an example as a mobile electronic device.

The display device DD according to some embodiments may be flexible. "Being flexible" represents the characteristics of being bendable, and may encompass all structures from a completely foldable structure to a structure bendable to the order of several nanometers. For example, the display device DD may be a foldable display device. Also, the display device DD may be rigid.

The thickness direction of the display device DD may be parallel to a third direction axis DR3 that is a normal direction of the plane defined by the first direction axis DR1 and the second direction axis DR2. The directions indicated as the first to third direction axes DR1, DR2, and DR3 illustrated in this specification may have a relative concept and thus may be changed to other directions. Also, the directions indicated as the first to third direction axes DR1, DR2, and DR3 may be referred to as first to third directions, and the same reference symbols may be used therefor. In this specification, the first direction axis DR1 is perpendicular to the second direction axis DR2, and the third direction axis DR3 may be a normal direction of the plane defined by the first direction axis DR1 and the second direction axis DR2.

The display device DD may include a first display surface FS which is parallel to the plane defined by the first direction axis DR1 and the second direction axis DR2 crossing the first direction axis DR1. The display device DD may display an image IM through the first display surface FS. The display device DD may display the image IM, in the third direction axis DR3, through the first display surface FS parallel to each of the first direction axis DR1 and the second direction axis DR2.

The display device DD may include the first display surface FS and a second display surface RS. The first display surface FS may include a first active area F-AA and a first peripheral area F-NAA. A module area EMA may be provided in the first active area F-AA. The display device DD may include an electronic module arranged so as to correspond to the module area EMA. For example, the electronic module may include one of a camera, a light detection sensor, or a heat detection sensor.

The display device DD may display the image IM through the first active area F-AA. Also, various types of external inputs may be sensed in the first active area F-AA. The first peripheral area F-NAA may be adjacent to the first active area F-AA. The first peripheral area F-NAA may surround the first active area F-AA. The shape of the first active area F-AA may be substantially defined by the first peripheral area F-NAA. Unlike the configuration illustrated in FIG. 1A, the first peripheral area F-NAA may be arranged adjacent to only one side of the first active area F-AA, or the first peripheral area F-NAA may be omitted. The display device DD may include active areas having various shapes and is not limited to one embodiment.

The second display surface RS may be defined as a surface which faces at least a portion of the first display surface FS. The second display surface RS may be defined as a portion of the rear surface of the display device DD.

The display device DD may include a folding area FA1 and non-folding areas NFA1 and NFA2. The display device DD may include a first non-folding area NFA1 and a second non-folding area NFA2 with one folding area FA1 arranged therebetween. However, this is merely an example, and the number of folding areas and the number of non-folding areas are not limited thereto. For example, embodiments according to the present disclosure may include any suitable number of folding areas and non-folding areas according to the design of the display device DD.

FIG. 1B is a perspective view showing an in-folding operation of the display device DD of FIG. 1A. The display device DD may be folded about a folding axis FX1 parallel to the second direction axis DR2. FIG. 1B illustrates one folding axis FX1, but the number of folding axes in the display device DD according to some embodiments is not limited thereto.

When the display device DD is in-folded, the first non-folding area NFA1 and the second non-folding area NFA2 may face each other. When the display device DD is in-folded, the first display surface FS may not be exposed to a user, but the second display surface RS may be exposed to the user. On the other hand, the display device DD may be out-folded so that the first display surface FS is exposed, but the second display surface RS is not exposed.

Figure 2:
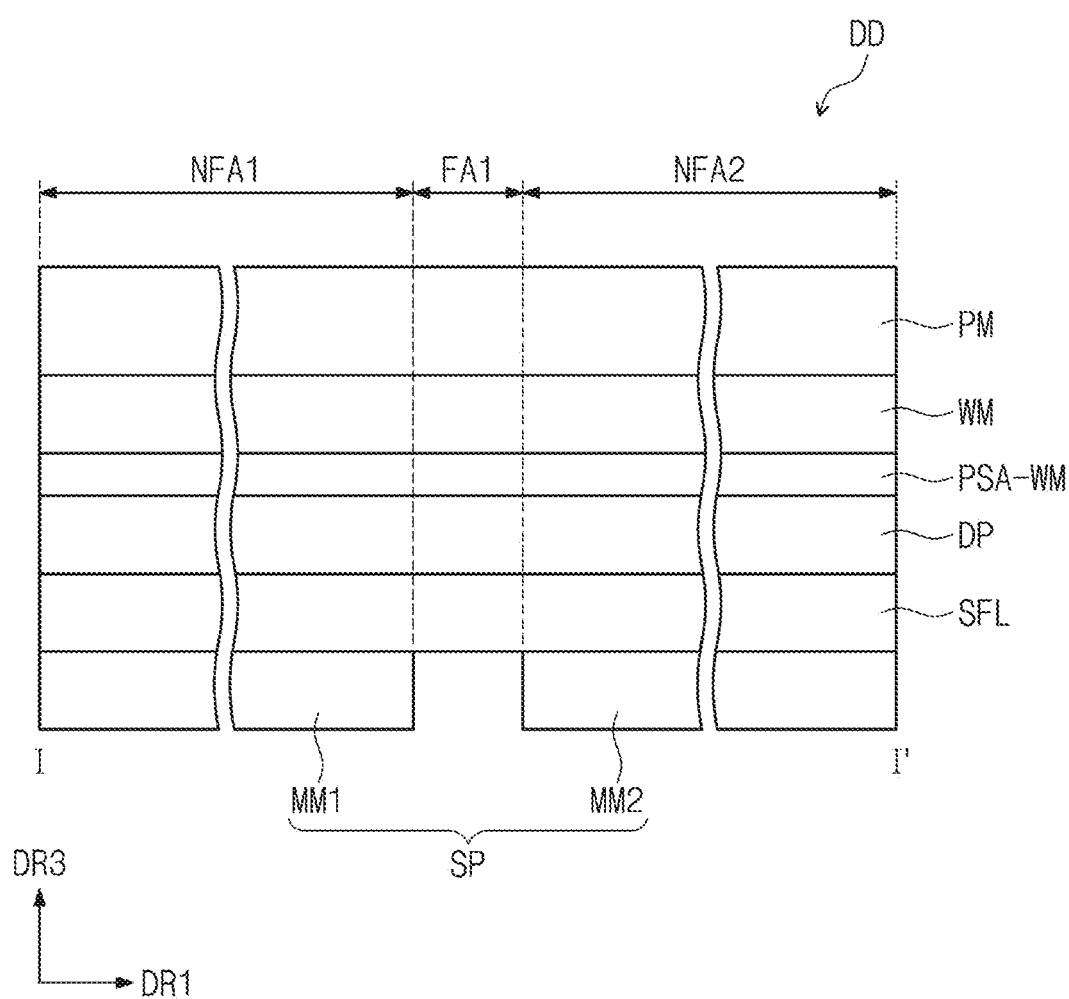
FIG. 2 is a cross-sectional view taken along the line I-I' of FIG. 1A.

FIG. 2 is a cross-sectional view taken along the line I-I' of FIG. 1A. The display device DD according to some embodiments may include a display panel DP and a protection member PM arranged above the display panel DP. The protection member PM will be described later in more detail with reference to FIGS. 3 and 4.

Also, the display device DD may include a window adhesive layer PSA-WM and a window WM which are arranged between the display panel DP and the protection member PM. An auxiliary functional layer SFL and a support member SP may be arranged below the display panel DP.

The support member SP may include a first support member MM1 and a second support member MM2. The first support member MM1 may be spaced apart from the second support member MM2 in parallel to a direction in which the first direction axis DR1 extends. The support member SP may overlap the non-folding areas NFA1 and NFA2, but may not overlap the folding area FA1. The first support member MM1 may overlap the first non-folding area NFA1, but may not overlap the folding area FA1. The second support member MM2 may overlap the second non-folding area NFA2, but may not overlap the folding area FA1. However, the embodiments are not limited thereto, and at least a portion of each of the first support member MM1 and the second support member MM2 may overlap the folding area FA1.

The support member SP may include a single layer or multi layers. The support member SP may include at least one of a heat dissipating member, a shielding member, or an insulating member. Each of the first support member MM1 and the second support member MM2 may be made of a metal alloy. For example, each of the first support member MM1 and the second support member MM2 may include stainless steel, aluminum, copper, or an alloy thereof. However, this is merely an example, and materials contained in the first support member MM1 and the second support member MM2 are not limited thereto.

The auxiliary functional layer SFL may be arranged on the support member SP. The auxiliary functional layer SFL may include a single layer or multi layers. For example, the auxiliary functional layer SFL may include at least one of a cushion layer, a barrier film, or a protection film. The auxiliary functional layer SFL may include a cushion layer made of foam or sponge. The auxiliary functional layer SFL may include the barrier film that prevents or reduces deformation of the display panel DP. The auxiliary functional layer SFL may include a colored polyimide film as a protection film. However, this is merely an example, and materials contained in the auxiliary functional layer SFL and functions of the auxiliary functional layer SFL are not limited thereto.

The display panel DP may be arranged above the auxiliary functional layer SFL. The display panel DP may be folded about the folding axis FX1 (see FIG. 1). The display panel DP may include a display element layer. For example, the display element layer may include an organic light emitting element, a quantum-dot light emitting element, a liquid crystal element layer, or the like. However, this is merely an example, and the embodiments are not limited thereto.

The window WM may be optically transparent. The window WM may include a single layer or multi layers. For example, the window WM may include glass or polyimide (PI) resin. However, this is merely an example, and materials contained in the window WM are not limited thereto.

The window adhesive layer PSA-WM may be arranged between the window WM and the display panel DP. The window WM may be coupled to the display panel DP by the window adhesive layer PSA-WM. The window adhesive layer PSA-WM may include a pressure sensitive adhesive film (PSA), an optically clear adhesive film (OCA), or an optically clear resin (OCR). In the display device DD according to some embodiments, the window adhesive layer PSA-WM may be omitted.

Figure 3:
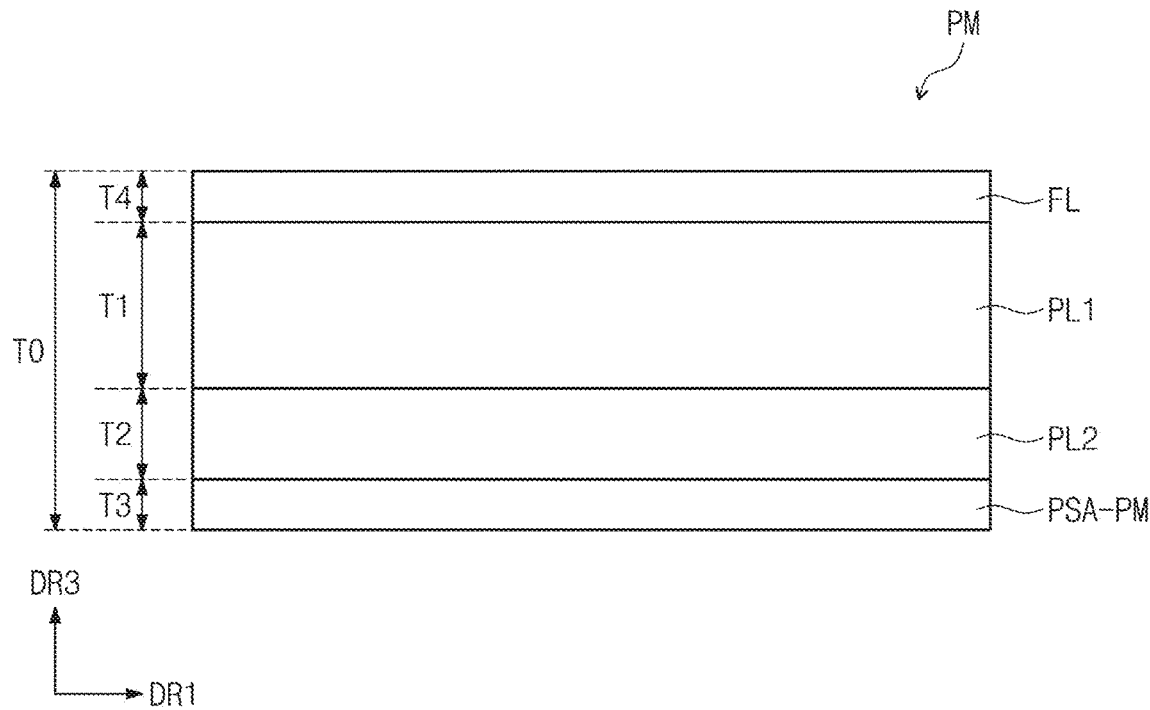
FIG. 3 is a cross-sectional view showing a display device according to some embodiments.

FIG. 3 is a cross-sectional view showing a protection member PM according to some embodiments. FIG. 3 shows the protection member PM of FIG. 2 in more detail.

The protection member PM according to some embodiments may include an adhesive layer PSA-PM arranged above the display panel DP, a first protection layer PL1 arranged above the adhesive layer PSA-PM, and a second protection layer PL2 arranged between the adhesive layer PSA-PM and the first protection layer PL1. For example, the protection member PM may be arranged above the window WM, and the adhesive layer PSA-PM of the protection member PM may be arranged above the protection member PM. The protection member PM may be coupled to the window WM by the adhesive layer PSA-PM.

According to some embodiments, the second protection layer PL2 may have a thickness less than that of the first protection layer PL1, and may have a modulus less than that of the first protection layer PL1. Also, the second protection layer PL2 may have a thickness greater than that of the adhesive layer PSA-PM, and may have a modulus greater than that of the adhesive layer PSA-PM. The protection member PM, which includes the second protection layer PL2 having the modulus less than that of the first protection layer PL1 and greater than that of the adhesive layer PSA-PM and having the thickness less than that of the first protection layer PL1 and greater than that of the adhesive layer PSA-PM, may exhibit characteristics in which the impact resistance and reliability are maintained. In the specification, the modulus is an elastic modulus.

A thickness T0 of the protection member PM may be about 200 μm to about 250 μm. When the thickness of the protection member is less than about 200 μm, the protection member and/or components (for example, the window, etc.) arranged below the protection member are damaged by external impact. The protection member does not protect the components arranged below when the external impact occurs, and the protection member and/or the components arranged below the protection member are damaged. Also, when the thickness of the protection member is greater than about 250 μm, the protection member is damaged when the display device is folded and unfolded. The protection member having the thickness greater than about 250 μm is not easily folded and unfolded, and the protection member may be peeled off from the display device or cracked. When the thickness of the protection member is greater than about 250 μm, the thickness of the display device including the protection member increases. Thus, the display device DD, which includes the protection member PM having the thickness T0 of about 200 μm to about 250 μm, may have the improved impact resistance and maintain the reliability when repeatedly folded and unfolded.

The first protection layer PL1 may have a first thickness T1. The first thickness T1 of the first protection layer PL1 may be about 65 μm to about 100 μm. Among the components included in the protection member PM, the first protection layer PL1 may have the greatest thickness which is the first thickness T1. That is, as a proportion of the overall thickness T0 of the protection member PM, the first protection layer PL1 may be thicker than any of the other layers of the protection member PM, according to some embodiments. The first thickness T1 of the first protection layer PL1 may be greater than the thicknesses of the second protection layer PL2 and the adhesive layer PSA-PM, which will be described in more detail later. For example, the first thickness T1 of the first protection layer PL1 may be less than or equal to about 50% of the thickness T0 of the protection member PM. The thickness T0 of the protection member PM may be about 200 μm, and the first thickness T1 of the first protection layer PL1 may be about 100 μm. However, this is merely an example, and the ratio of the first thickness T1 of the first protection layer PL1 to the thickness T0 of the protection member PM is not limited thereto.

When the thickness of the first protection layer is less than about 65 μm, the first protection layer and/or components (for example, the second protection layer, and the window, etc.) arranged below the first protection layer are damaged. The first protection layer having the thickness less than about 65 μm is vulnerable to the impact, and thus, when the impact is applied to the first protection layer, the first protection layer and/or the components arranged below the first protection layer are damaged.

Also, the first protection layer having the thickness greater than about 100 μm is damaged when the display device is folded and unfolded. The first protection layer having the thickness greater than about 100 μm is not easily folded and unfolded, and is peeled off from the display device or cracked when folded and unfolded. According to some embodiments, the first protection layer PL1 having the thickness T1 of about 65 μm to about 100 μm may protect the components arranged below the first protection layer PL1 against external impact, and the reliability may be maintained even when the display device DD is repeatedly folded and unfolded.

The first protection layer PL1 may have a first-first modulus at room temperature. The first-first modulus of the first protection layer PL1 may be about 4 GPa to about 5 GPa. For example, the first-first modulus of the first protection layer PL1 may be about 4.5 GPa to about 5 GPa. When the modulus of the first protection layer is less than about 4 GPa or the modulus of the first protection layer is greater than about 5 GPa, the first protection layer is cracked or peeled off from the display device when the display device is folded or unfolded. In the protection member PM according to some embodiments, the first protection layer PL1 having the modulus of about 4 GPa to about 5 GPa at room temperature may maintain the impact resistance and reliability.

Also, the first protection layer PL1 may have a first-second modulus of about 4.2 GPa to about 4.4 GPa at about 60° C. The first protection layer PL1 having the first-second modulus of about 4.2 GPa to about 4.4 GPa at about 60° C. may maintain the impact resistance and reliability even under a relatively high temperature condition.

According to some embodiments, the second protection layer PL2 may have a thickness less than that of the first protection layer PL1. A second thickness T2 of the second protection layer PL2 may be less than the first thickness T1 of the first protection layer PL1. The minimum value of the second thickness T2 of the second protection layer PL2 may be about 20 μm. The maximum value of the second thickness T2 of the second protection layer PL2 may satisfy Equation (1) below.

$$T2_{max} = (0.13 \times T1 - 8.25) \times \ln M2 + 0.68 \times T1 - 5.1 \quad (1)$$

In Equation (1), '$T2_{max}$' is the maximum value of the second thickness T2 of the second protection layer PL2, and 'T1' is the first thickness of the first protection layer PL1. 'M2' is a second-second modulus of the second protection layer PL2 at about 60° C. The second protection layer PL2 may have a second-first modulus at room temperature and may have a second-second modulus at about 60° C.

In Equation (1), the maximum value $T2_{max}$ of the thickness of the second protection layer PL2 may be proportional to the first thickness T1 of the first protection layer PL1. As the first thickness T1 of the first protection layer PL1 increases, the maximum value T2$_{max}$ of the thickness of the second protection layer PL2 may increase. Also, the maximum value T2$_{max}$ of the thickness of the second protection layer PL2 may be proportional to the second-second modulus of the second protection layer PL2 at about 60° C. As the second-second modulus of the second protection layer PL2 at about 60° C. has a higher value, the maximum value T2$_{max}$ of the thickness of the second protection layer PL2 may increase.

The second-second modulus of the second protection layer PL2 at about 60° C. may be about 36 MPa to about 400 MPa. When the modulus of the second protection layer at about 60° C. is less than about 36 MPa or the modulus of the second protection layer at about 60° C. is greater than about 400 MPa, the second protection layer may be peeled off from the display device or cracked when the display device is folded or unfolded.

At about 60° C. compared to room temperature, the peeling off (that is, buckling) of the protection member may be more serious. According to some embodiments, the display device DD, which includes the protection member PM including the second protection layer PL2 having the modulus of about 36 MPa to about 400 MPa at about 60° C., may maintain the impact resistance and reliability even under a relatively high temperature condition.

According to some embodiments, the second thickness T2 of the second protection layer PL2 may be less than the first thickness T1 of the first protection layer PL1. The second thickness T2 of the second protection layer PL2 may be about 20 μm to about 95 μm. That is, the maximum value T2$_{max}$ of the second thickness T2 of the second protection layer PL2 may be about 95 μm.

For example, in Equation (1), when the second-second modulus M2 of the second protection layer PL2 at about 60° C. is about 36 MPa and the first thickness T1 of the first protection layer PL1 is about 65 μm, the maximum value T2$_{max}$ of the thickness of the second protection layer PL2 may be about 40 μm. The second thickness T2 of the second protection layer PL2, which is arranged below the first protection layer PL1 having the thickness of about 65 μm and has the second-second modulus of about 36 MPa at about 60° C., may be about 20 μm to about 40 μm.

In Equation (1), when the second-second modulus M2 of the second protection layer PL2 at about 60° C. is about 36 MPa and the first thickness T1 of the first protection layer PL1 is about 100 μm, the maximum value T2$_{max}$ of the thickness of the second protection layer PL2 may be about 80 μm. The second thickness T2 of the second protection layer PL2, which is arranged below the first protection layer PL1 having the thickness of about 100 μm and has the second-second modulus of about 36 MPa at about 60° C., may be about 20 μm to about 80 μm.

In Equation (1), when the second-second modulus M2 of the second protection layer PL2 at about 60° C. is about 124 MPa and the first thickness T1 of the first protection layer PL1 is about 65 μm, the maximum value T2$_{max}$ of the thickness of the second protection layer PL2 may be about 40 μm. The second thickness T2 of the second protection layer PL2, which is arranged below the first protection layer PL1 having the thickness of about 65 μm and has the second-second modulus of about 124 MPa at about 60° C., may be about 20 μm to about 40 μm.

In Equation (1), when the second-second modulus M2 of the second protection layer PL2 at about 60° C. is about 124 MPa and the first thickness T1 of the first protection layer PL1 is about 100 μm, the maximum value T2$_{max}$ of the thickness of the second protection layer PL2 may be about 86 μm. The second thickness T2 of the second protection layer PL2, which is arranged below the first protection layer PL1 having the thickness of about 100 μm and has the second-second modulus of about 124 MPa at about 60° C., may be about 20 μm to about 86 μm.

In Equation (1), when the second-second modulus M2 of the second protection layer PL2 at about 60° C. is about 383 MPa and the first thickness T1 of the first protection layer PL1 is about 65 μm, the maximum value T2$_{max}$ of the thickness of the second protection layer PL2 may be about 41 μm. The second thickness T2 of the second protection layer PL2, which is arranged below the first protection layer PL1 having the thickness of about 65 μm and has the second-second modulus of about 383 MPa at about 60° C., may be about 20 μm to about 41 μm.

In Equation (1), when the second-second modulus M2 of the second protection layer PL2 at about 60° C. is about 383 MPa and the first thickness T1 of the first protection layer PL1 is about 100 μm, the maximum value T2$_{max}$ of the thickness of the second protection layer PL2 may be about 92 μm. The second thickness T2 of the second protection layer PL2, which is arranged below the first protection layer PL1 having the thickness of about 100 μm and has the second-second modulus of about 383 MPa at about 60° C., may be about 20 μm to about 92 μm. However, this is merely an example, and the first thickness T1 of the first protection layer PL1 and the second-second modulus of the second protection layer PL2 at about 60° C. are not limited thereto.

At room temperature, the second-first modulus of the second protection layer PL2 may be less than the first-first modulus of the first protection layer PL1. The second-first modulus may be about 10 MPa to about 500 MPa. When the modulus of the second protection layer at room temperature is less than about 10 MPa or the modulus of the second protection layer at room temperature is greater than about 500 MPa, the second protection layer is not easily folded and unfolded, and the second protection layer is peeled off from the display device or cracked when repeatedly folded and unfolded. In the protection member PM according to some embodiments, the second protection layer PL2, which has the second-first modulus of about 10 MPa to about 500 MPa less than the first-first modulus of the first protection layer PL1, may contribute to improving the impact resistance of the display device DD and maintaining the reliability.

The protection member PM, which includes the second protection layer PL2 in which the maximum value T2$_{max}$ of the thickness satisfies Equation (1), may have a buckling index of about 0.5 or less. The buckling index may be defined as a ratio of a relative load to a critical force. The critical force is a minimal force which generates buckling when a force is applied to press a column having a length (e.g., a set or predetermined length) in one direction.

The critical force satisfies Equation (2) below, and the buckling index satisfies Equation (3) below, and this is the equation relating to Euler buckling theory.

$$F_c = \frac{\pi^2 EI}{(kL)^2} \quad (2)$$

In Equation (2), F$_c$ is a critical force, E is a modulus of a column, and I is moment of inertia of the column. L is the overall length of the column, and kL is a length in one direction corresponding to a portion of the column in which buckling occurs.

$$\frac{1}{BRI} = \frac{F}{F_C} \quad (3)$$

In Equation (3), BRI is a buckling index, and F is the cross-sectional area of the column times a compressive force. As the buckling index increases, the possibility of the occurrence of buckling increases. As the buckling index of the protection member has a higher value, the possibility of the occurrence of buckling of the protection member increases when repeatedly folded and unfolded. As the buckling index of the protection member has a higher value, the reliability of the display device including the protection member deteriorates.

According to some embodiments, the protection member PM, which includes the second protection layer PL2 in which the maximum value of the thickness satisfies Equation (1), may have a buckling index of about 0.5 or less. The possibility of the occurrence of buckling in the protection member when repeatedly folded and unfolded increases in the protection member having a buckling index greater than 0.5, compared to a protection member having a buckling index of about 0.5 or less. The protection member PM having a buckling index of about 0.5 or less is not peeled off from the display device DD when repeatedly folded and unfolded, and may contribute to maintaining the reliability of the display device DD. Thus, the display device DD, which includes the protection member PM having a buckling index of about 0.5 or less, may maintain the reliability when repeatedly folded and unfolded.

A thickness T3 of the adhesive layer PSA-PM may be less than the first thickness T1 of the first protection layer PL1 and the second thickness T2 of the second protection layer PL2. The thickness T3 of the adhesive layer PSA-PM may be determined by taking into consideration a buckling index. Whenever the thickness T3 of the adhesive layer PSA-PM increases by about 5 μm, the buckling index increases by about 0.01. Table 1 below shows buckling indexes of the protection member PM according to the thicknesses of the adhesive layer PSA-PM.

In Table 1, each of protection members in Experimental example A and Experimental example B includes an adhesive layer, a second protection layer arranged above the adhesive layer, and a first protection layer arranged above the second protection layer. In Experimental example A and Experimental example B, the thicknesses of the first protection layers and the thicknesses of the second protection layers are equal to each other, but thicknesses of the adhesive layers are different from each other. In the protection members of Experimental example A and Experimental example B, the thickness of the first protection layer is about 100 μm, the thickness of the second protection layer is about 60 μm, and the modulus of the second protection layer at about 60° C. is about 124 MPa. In the protection members of Experimental example A and Experimental example B, the thickness of the first protection layer corresponds to the thickness range of about 65 μm to about 100 μm for the first protection layer according to some embodiments. When the maximum value of the thickness of the second protection layer in each of the protection members of Experimental example A and Experimental example B is calculated by using Equation (1), the maximum value is about 86 μm. That is, in the protection members of Experimental example A and Experimental example B, the thickness of the second protection layer corresponds to the thickness range of about 20 μm to about 80 μm for the second protection layer according to Equation (1).

In Experimental example A and Experimental example B, the first protection layer includes polyethylene terephthalate (PET), the second protection layer includes thermoplastic polyurethane (TPU), and the adhesive layer includes a pressure sensitive adhesive film (PSA). In Experimental example A, the thickness of the adhesive layer is about 35 μm. In Experimental example B, the thickness of the adhesive layer is about 50 μm.

TABLE 1

| Classification | Thickness of adhesive layer | Buckling index |
|---|---|---|
| Experimental example A | 35 μm | 0.39 |
| Experimental example B | 50 μm | 0.42 |

Referring to Table 1, it may be seen that the buckling index increases by about 0.03 as the thickness of the adhesive layer increases by about 15 μm. When a change in thickness of the adhesive layer is about 5 μm, a change in buckling index is about 0.01. That is, it may be seen that the buckling index increases as the thickness of the adhesive layer increases. Thus, the thickness of the second protection layer is determined from the thickness of the first protection layer by using Equation (1), and the thickness of the adhesive layer may be adjusted by taking into consideration the buckling index.

According to some embodiments, the thickness T3 of the adhesive layer PSA-PM may be about 35 μm to about 80 μm. When the thickness of the adhesive layer is less than about 35 μm, the coupling force between a component arranged above the adhesive layer and a component arranged below the adhesive layer deteriorates because the adhesive layer is too thin. When the thickness of the adhesive layer is greater than about 80 μm, the display device is not easily folded and unfolded, and the thickness of the display device increases. According to some embodiments, the protection member PM, which includes the adhesive layer PSA-PM of about 35 μm to about 80 μm, may contribute to maintaining the reliability of the display device DD. Also, the protection member PM, which includes the adhesive layer PSA-PM of about 35 μm to about 80 μm, may maintain a suitable thickness of the display device DD.

The adhesive layer PSA-PM may have a third-first modulus at room temperature and may have a third-second modulus at about 60° C. At room temperature, the third-first modulus of the adhesive layer PSA-PM may be less than the first-first modulus of the first protection layer PL1 and the second-first modulus of the second protection layer PL2. The third-first modulus of the adhesive layer PSA-PM at room temperature may be about 20 KPa to about 50 KPa. A protection member, which includes an adhesive layer having a modulus less than about 20 KPa or having a modulus greater than about 50 KPa at room temperature, is not easily folded and unfolded, and is peeled off from the display device or cracked when folded and unfolded. According to some embodiments, the protection member PM, which includes the adhesive layer PSA-PM having the third-first modulus of about 20 KPa to about 50 KPa at room temperature, may contribute to maintaining the reliability of the display device DD.

Also, third-second modulus of the adhesive layer PSA-PM at about 60° C. may be about 10 KPa to about 40 KPa. The adhesive layer PSA-PM having the third-second modulus of about 10 KPa to about 40 KPa at about 60° C. may maintain the impact resistance and reliability.

According to some embodiments, each of the first protection layer PL1 and the second protection layer PL2 may include an optically transparent polymer material. For example, the first protection layer PL1 may include at least one of polyethylene terephthalate (PET), polybutylene terephthalate (PBT), polyethylene naphthalate (PEN), polycarbonate (PC), poly methyl methacrylate (PMMA), polystyrene (PS), polyvinyl chloride (PVC), polyethersulfone (PES), polyethylene (PE), polypropylene (PP), polyimide (PA), modified-polyphenylene oxide (m-PPO), polyoxymethylene (POM), polyarylsulfones (PSU), polyphenylene sulfide (PPS), polyimide (PI), polyethylenimine (PEI), polyether ether ketone (PEEK), polyamide-imide (PAI), or polyarylate (PAR).

The second protection layer PL2 may include at least one of thermoplastic polyurethane (TPU), thermoplastic polyester elastomer (TPEE), thermoplastic vulcanizate (TPV), thermoplastic olefin (TPO), thermoplastic starch (TPS), ethylene propylene rubber (EPDM), or polyether block amide (PEBA).

For example, the first protection layer PL1 may include polyethylene terephthalate, and the second protection layer PL2 may include thermoplastic polyurethane. However, materials included in the first protection layer PL1 and the second protection layer PL2 are not limited thereto, and the second protection layer PL2 may include elastomer having a modulus less than that of the first protection layer PL1.

The second protection layer PL2 may be provided below the first protection layer PL1 through direct coating. One surface of the first protection layer PL1 may be directly coated with a material for forming the second protection layer PL2. However, this is merely an example, and a method for forming the second protection layer PL2 is not limited thereto.

According to some embodiments, the protection member PM may further include a functional layer FL. The functional layer FL may be arranged above the first protection layer PL1. For example, the functional layer FL may include at least one of a hard coating layer or an anti-fingerprint layer. The functional layer FL may include a single layer or multi layers. The functional layer FL made of a single layer may include both a hard coating function and an anti-fingerprint function. On the other hand, the functional layer FL made of multi layers may respectively include a hard coating layer and an anti-fingerprint layer.

A modulus of the functional layer FL may be equal to the first-first modulus of the first protection layer PL1 or may be less than the first-first modulus of the first protection layer PL1. The modulus of the functional layer FL at room temperature may be about 2 GPa to about 4 GPa. A functional layer, which has a modulus less than about 2 GPa or has a modulus greater than about 4 GPa, is not easily folded and unfolded. A protection member, which includes the functional layer having a modulus less than about 2 GPa or having a modulus greater than about 4 GPa, may be peeled off from the display device or cracked when repeatedly folded and unfolded. According to some embodiments, the protection member PM, which includes the functional layer FL having the modulus of about 2 GPa to about 4 GPa, may contribute to maintaining the reliability of the display device DD.

A thickness T4 of the functional layer FL may be about 5 μm to about 10 μm. When a protection member, which includes a functional layer having a thickness less than about 5 μm, is subjected to external impact, the functional layer and/or a component (for example, the first protection layer) arranged below the functional layer are damaged. Also, a protection member, which includes a functional layer having a thickness greater than about 10 μm, may be peeled off from the display device when repeatedly folded and unfolded. The protection member PM, which includes the functional layer FL having the thickness T4 of about 5 μm to about 10 μm, may improve the impact resistance. Also, the display device DD including the protection member PM may improve the impact resistance and maintain the reliability.

Figure 4:
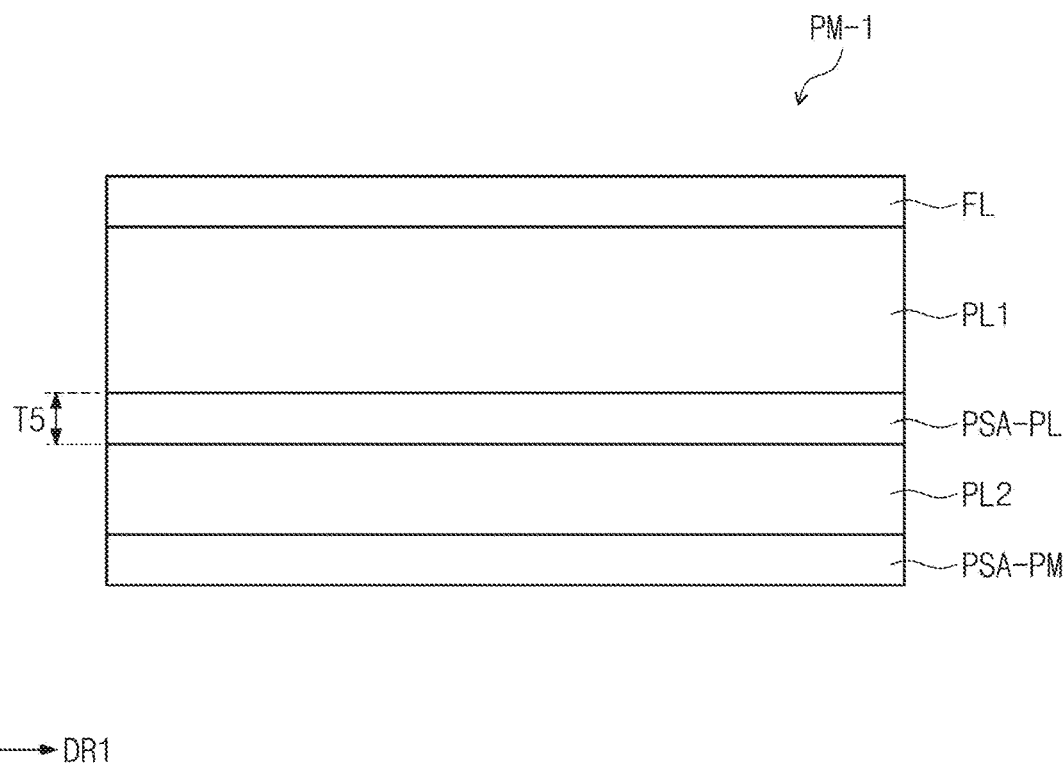
FIG. 4 is a cross-sectional view showing a display device according to some embodiments.

FIG. 4 is a cross-sectional view showing a protection member PM-1 according to some embodiments. Unlike FIG. 3, the protection member PM-1 of FIG. 4 may further include an auxiliary adhesive layer PSA-PL. The auxiliary adhesive layer PSA-PL may be provided between the first protection layer PL1 and the second protection layer PL2. The first protection layer PL1 may be coupled to the second protection layer PL2 by the auxiliary adhesive layer PSA-PL. For example, the auxiliary adhesive layer PSA-PL may include a pressure sensitive adhesive film (PSA), an optically clear adhesive film (OCA), or an optically clear resin (OCR).

According to some embodiments, moduli of the auxiliary adhesive layer PSA-PL at room temperature and about 60° C. may be less than the moduli of the first protection layer PL1 and the moduli of the second protection layer PL2.

The modulus of the auxiliary adhesive layer PSA-PL at room temperature may be less than the first-first modulus of the first protection layer PL1 and the second-first modulus of the second protection layer PL2. The modulus of the auxiliary adhesive layer PSA-PL at about 60° C. may be less than the first-second modulus of the first protection layer PL1 and the second-second modulus of the second protection layer PL2. The moduli of the auxiliary adhesive layer PSA-PL at room temperature and about 60° C. may be equal to or greater than the moduli of the adhesive layer PSA-PM. The modulus of the auxiliary adhesive layer PSA-PL at room temperature may be equal to or greater than the third-first modulus of the adhesive layer PSA-PM. The modulus of the auxiliary adhesive layer PSA-PL about 60° C. may be equal to or greater than the third-second modulus of the adhesive layer PSA-PM. For example, the moduli of the auxiliary adhesive layer PSA-PL at room temperature and 60° C. may have substantially similar levels with the moduli of the adhesive layer PSA-PM.

A thickness T5 of the auxiliary adhesive layer PSA-PL may be less than the thickness T3 of the adhesive layer PSA-PM. For example, the thickness of the auxiliary adhesive layer PSA-PL may be about 10 μm to about 35 μm. The protection member PM, which includes the auxiliary adhesive layer PSA-PL having the thickness of about 10 μm to about 35 μm, may contribute to maintaining the impact resistance and reliability of the display device DD. The auxiliary adhesive layer having a thickness less than about 10 μm exhibits deteriorated coupling force with respect to components arranged below and above the auxiliary adhesive layer. The auxiliary adhesive layer having a thickness greater than about 35 μm is not easily folded and unfolded, and the thickness of the display device increases.

The protection member according to the related art includes an adhesive layer and one protection layer arranged above the adhesive layer, and the one protection layer may be made of a single material. A protection member including one protection layer made of a single material is vulnerable to impact (or pressure), and the external impact is not alleviated or absorbed, but transmitted to a component (for example, a window) arranged below the protection member. Accordingly, the protection member and/or the component arranged below the protection member may be damaged, and the reliability of the display device may be deteriorated.

Each of the protection members PM and PM-1 of embodiments includes the adhesive layer PSA-PM, the second protection layer PL2 arranged above the adhesive layer PSA-PM, and the first protection layer PL1 arranged above the second protection layer PL2, and the maximum value of the thickness of the second protection layer PL2 may satisfy Equation (1) described above. The second thickness T2 of the second protection layer PL2 may be less than the first thickness T1 of the first protection layer PL1 and greater than the thickness T3 of the adhesive layer PSA-PM, and the modulus of the second protection layer PL2 may be less than the modulus of the first protection layer PL1 and greater than the modulus of the adhesive layer PSA-PM. Each of the protection members PM and PM-1, which includes the first protection layer PL1, the second protection layer PL2, and the adhesive layer PSA-PM having different moduli and in which the modulus is reduced from an upper portion toward a lower portion, may exhibit the improved impact resistance characteristics.

When impacts are applied from the outside, rates at which the impacts are spread out in the first protection layer PL1, the second protection layer PL2, and the adhesive layer PSA-PM are different from each other because the moduli of the first protection layer PL1, the second protection layer PL2, and the adhesive layer PSA-PM are different from each other. As the rates at which the impacts are spread out are different from each other, levels of the impacts passing through the protection members PM and PM-1 may be alleviated, or the impacts may be absorbed by the protection members PM and PM-1. Thus, the display devices DD including the protection members PM and PM-1 according to some embodiments may improve the impact resistance. Also, each of the protection members PM and PM-1, which includes the second protection layer PL2 having the second thickness T2 less than the first thickness T1 of the first protection layer PL1 and greater than the thickness T3 of the adhesive layer PSA-PM, may maintain a suitable thickness of the display device DD and contribute to maintaining the reliability of the display device DD when folded and unfolded.

Figure 5A:
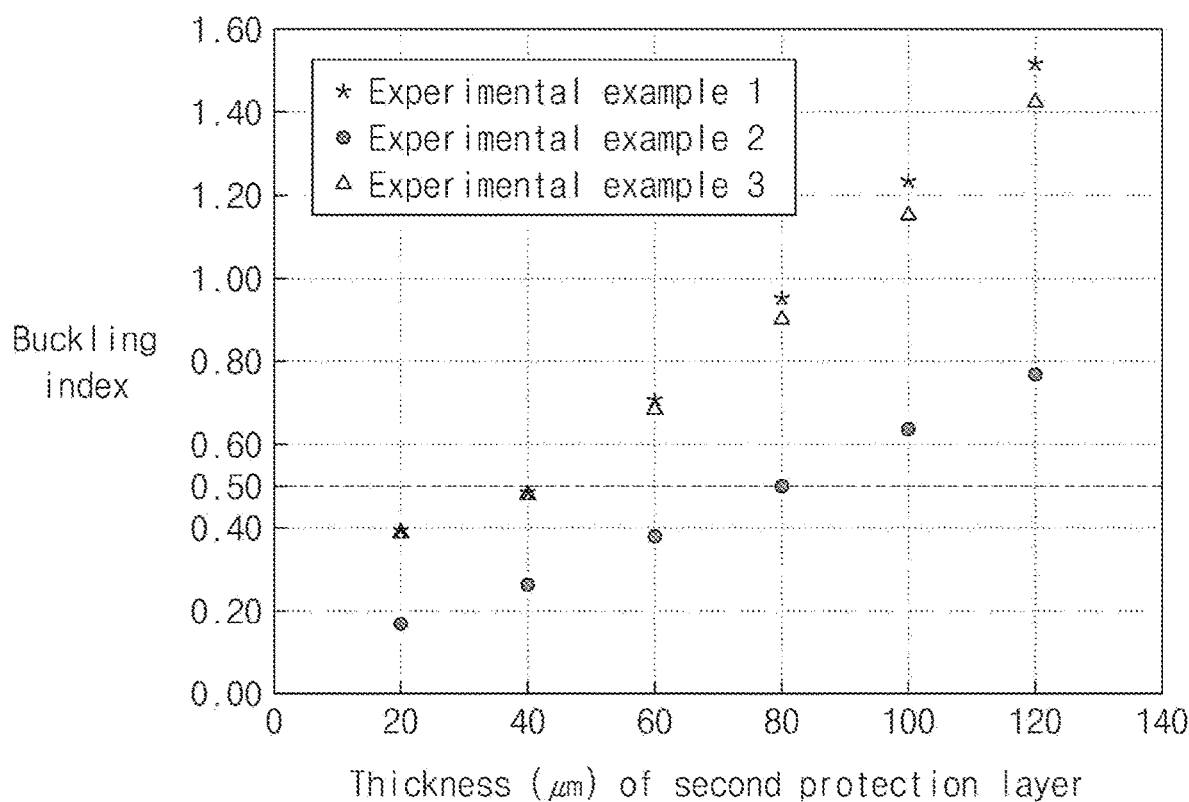
FIG. 5A is a graph showing buckling indexes according to thicknesses of a second protection layer according to some embodiments.
Figure 5B:
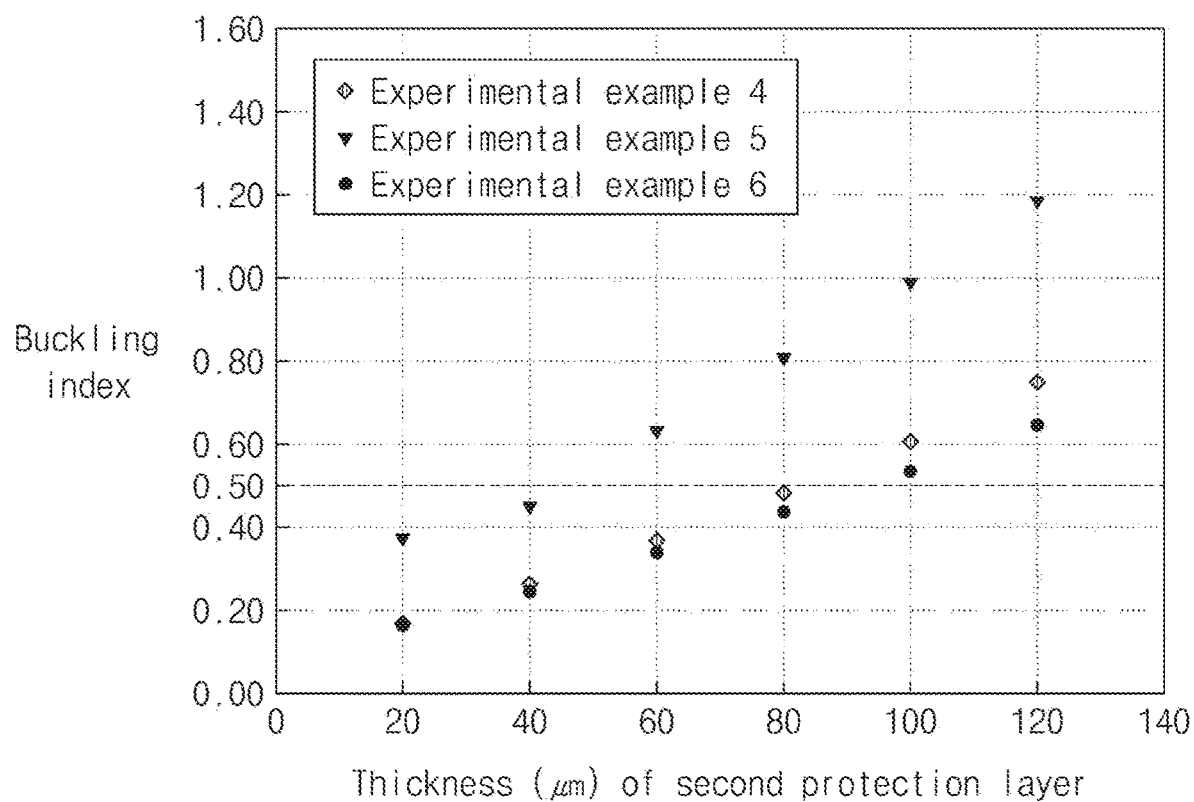
FIG. 5B is a graph showing buckling indexes according to thicknesses of a second protection layer according to some embodiments.

FIGS. 5A and 5B are graphs showing buckling indexes according to the thicknesses of the second protection layer. FIGS. 5A shows buckling indexes when the thicknesses of second protection layers are about 20 μm, about 40 μm, about 60 μm, about 80 μm, about 100 μm, and about 120 μm in protection members of Experimental examples 1 to 3. FIGS. 5B shows buckling indexes when the thicknesses of second protection layers are about 20 μm, about 40 μm, about 60 μm, about 80 μm, about 100 μm, and about 120 μm in protection members of Experimental examples 4 to 6.

Each of the second protection layers in the protection members of Experimental examples 1 to 6 includes thermoplastic polyurethane (TPU), and each of first protection layers includes polyethylene terephthalate (PET) having the modulus of about 4 GPa at room temperature. Also, an adhesive layer having the thickness of about 35 μm may be provided in each of Experimental examples 1 to 6.

A modulus, at room temperature, of each of the first protection layers in the protection members of Experimental examples 1 to 6 corresponds to the range of about 4 GPa to about 5 GPa for the first-first modulus of the first protection layer at room temperature in some embodiments. Also, the thickness of each of the adhesive layers in the protection members of Experimental examples 1 to 6 corresponds to the thickness range of about 35 μm to about 80 μm for the adhesive layer in some embodiments. The thicknesses of the first protection layers and the moduli, at about 60° C., of the second protection layers in the protection members of Experimental examples 1 to 6 are shown in Table 2 below.

TABLE 2

| Classification | Thickness of first protection layer | Modulus of second protection layer, 60° C. |
|---|---|---|
| Experimental example 1 | 65 μm | 36 MPa |
| Experimental example 2 | 100 μm | 36 MPa |
| Experimental example 3 | 65 μm | 124 MPa |
| Experimental example 4 | 100 μm | 124 MPa |
| Experimental example 5 | 65 μm | 383 MPa |
| Experimental example 6 | 100 μm | 383 MPa |

Referring to Table 2, the thickness of the first protection layer in the protection members of Experimental examples 1, 3, and 5 is about 65 μm, and the thickness of the first protection layer in the protection members of Experimental examples 2, 4, and 6 is about 100 μm. In the protection members of Experimental examples 1 and 2, the modulus of the second protection layer at about 60° C. is about 36 MPa. In the protection members of Experimental examples 3 and 4, the modulus of the second protection layer at about 60° C. is about 124 MPa. In the protection members of Experimental examples 5 and 6, the modulus of the second protection layer at about 60° C. is about 383 MPa. In the protection members of Experimental examples 1 to 6, the thickness of the first protection layer corresponds to the thickness range of about 65 μm to about 100 μm for the first protection layer according to some embodiments. Also, in the protection members of Experimental examples 1 to 6, the modulus of the second protection layer at about 60° C. corresponds to the range of about 36 MPa to about 400 MPa for the second-second modulus of the second protection layer at about 60° C. according to some embodiments.

Table 3 below shows the buckling indexes according to the thicknesses of the second protection layers in the protection members of Experimental examples 1 to 6. That is, Table 3 shows the buckling indexes of the graphs of FIGS. 5A and 5B in more detail. In Table 3, 'NG' represents a case in which the buckling index is greater than about 0.5, and 'OK' represents a case in which the buckling index is about 0.5 or less.

TABLE 3

| Classification | Thickness of second protection layer | | | | | |
|---|---|---|---|---|---|---|
| | 20 μm | 40 μm | 60 μm | 80 μm | 100 μm | 120 μm |
| Experimental example 1 | 0.40 (OK) | 0.49 (OK) | 0.71 (NG) | 0.96 (NG) | 1.24 (NG) | 1.52 (NG) |
| Experimental example 2 | 0.17 (OK) | 0.27 (OK) | 0.38 (OK) | 0.50 (OK) | 0.64 (NG) | 0.77 (NG) |
| Experimental example 3 | 0.39 (OK) | 0.48 (OK) | 0.69 (NG) | 0.91 (NG) | 1.16 (NG) | 1.42 (NG) |
| Experimental example 4 | 0.17 (OK) | 0.26 (OK) | 0.37 (OK) | 0.48 (OK) | 0.61 (NG) | 0.75 (NG) |
| Experimental example 5 | 0.38 (OK) | 0.46 (OK) | 0.64 (NG) | 0.81 (NG) | 0.99 (NG) | 1.19 (NG) |
| Experimental example 6 | 0.16 (OK) | 0.25 (OK) | 0.34 (OK) | 0.44 (OK) | 0.54 (NG) | 0.65 (NG) |

From Table 3, it may be seen that the buckling index of the protection member of Experimental example 1 is about 0.5 or less when the thickness of the second protection layer is about 20 μm or about 40 μm. It may be seen that the buckling index of the protection member of Experimental example 2 is about 0.5 or less when the thickness of the second protection layer is about 20 μm, about 40 μm, about 60 μm, or about 80 μm. In the protection members of Experimental examples 1 and 2, the second protection layers have the same modulus of about 36 MPa at about 60° C., and the first protection layers have thicknesses different from each other. The thickness of the first protection layer in the protection member of Experimental example 1 is about 65 μm, and the thickness of the first protection layer in the protection member of Experimental example 2 is about 100 μm. In the protection member of Experimental example 2 compared to the protection member of Experimental example 1, it is determined that the maximum value of the thickness of the second protection layer increases as the thickness of the first protection layer increases.

In the protection members of Experimental examples 3 and 4, the second protection layers have the same modulus of about 124 MPa at about 60° C., and the first protection layers have thicknesses different from each other. The thickness of the first protection layer in the protection member of Experimental example 3 is about 65 μm, and the thickness of the first protection layer in the protection member of Experimental example 4 is about 100 μm. Referring to Table 3, it may be seen that the buckling index of the protection member of Experimental example 3 is about 0.5 or less when the thickness of the second protection layer is about 20 μm or about 40 μm. It may be seen that the buckling index of the protection member of Experimental example 4 is about 0.5 or less when the thickness of the second protection layer is about 20 μm, about 40 μm, about 60 μm, or about 80 μm. In the protection member of Experimental example 4 compared to the protection member of Experimental example 3, it is determined that the maximum value of the thickness of the second protection layer increases as the thickness of the first protection layer increases.

In the protection members of Experimental examples 5 and 6, the second protection layers have the same modulus of about 383 MPa at about 60° C., and the first protection layers have thicknesses different from each other. The thickness of the first protection layer in the protection member of Experimental example 5 is about 65 μm, and the thickness of the first protection layer in the protection member of Experimental example 6 is about 100 μm. It may be seen that the buckling index of the protection member of Experimental example 5 is about 0.5 or less when the thickness of the second protection layer is about 20 μm or about 40 μm. It may be seen that the buckling index of the protection member of Experimental example 6 is about 0.5 or less when the thickness of the second protection layer is about 20 μm, about 40 μm, about 60 μm, or about 80 μm. In the protection member of Experimental example 6 compared to the protection member of Experimental example 5, it is determined that the maximum value of the thickness of the second protection layer increases as the thickness of the first protection layer increases.

Equation (1) described above is derived from the graphs of FIGS. 5A and 5B. Equation (1) for calculating the maximum value of the thickness of the second protection layer is an equation which is derived from the thickness of the first protection layer, the modulus value of the second protection layer at about 60° C., and the thickness of the second protection layer, which correspond to a case when the buckling index is about 0.5 or less in FIGS. 5A and 5B.

In a case where the protection member of Experimental example 1 satisfies that the buckling index is about 0.5 or less, it may be seen that when the maximum value of the thickness of the second protection layer is calculated by using Equation (1), the maximum value is about 40 μm. In a case where the protection member of Experimental example 3 satisfies that the buckling index is about 0.5 or less, it may be seen that when the maximum value of the thickness of the second protection layer is calculated, the maximum value is about 40 μm. In a case where the protection member of Experimental example 5 satisfies that the buckling index is about 0.5 or less, it may be seen that when the maximum value of the thickness of the second protection layer is calculated by using Equation (1), the maximum value is about 41 μm.

In the protection members of Experimental examples 1, 3, and 5, the first protection layers have the same thickness of about 65 μm, and the second protection layers have different moduli at about 60° C. The modulus of the second protection layer at about 60° C. in the protection member of Experimental example 1 is about 36 MPa, the modulus of the second protection layer at about 60° C. in the protection member of Experimental example 3 is about 124 MPa, and the modulus of the second protection layer at about 60° C. in the protection member of Experimental example 5 is about 383 MPa.

In a case where the protection member of Experimental example 2 satisfies that the buckling index is about 0.5 or less, it may be seen that when the maximum value of the thickness of the second protection layer is calculated by using Equation (1), the maximum value is about 80 μm. In a case where the protection member of Experimental example 4 satisfies that the buckling index is about 0.5 or less, it may be seen that when the maximum value of the thickness of the second protection layer is calculated by using Equation (1), the maximum value is about 86 μm. In a case where the protection member of Experimental example 6 satisfies that the buckling index is about 0.5 or less, it may be seen that when the maximum value of the thickness of the second protection layer is calculated by using Equation (1), the maximum value is about 92 μm.

In the protection members of Experimental examples 2, 4, and 6, the first protection layers have the same thickness of about 100 μm, and the second protection layers have different moduli at about 60° C. The modulus of the second protection layer at about 60° C. in the protection member of Experimental example 2 is about 36 MPa, the modulus of the second protection layer at about 60° C. in the protection member of Experimental example 4 is about 124 MPa, and the modulus of the second protection layer at about 60° C. in the protection member of Experimental example 6 is about 383 MPa. It is determined that the maximum value of the thickness of the second protection layer increases as the modulus of the second protection layer at about 60° C. increases.

The display device according to some embodiments may include the display panel and the protection member arranged above the display panel. The protection member may include the adhesive layer arranged above the display panel, the second protection layer arranged above the adhesive layer, and the first protection layer arranged above the second protection layer. The thickness of the second protection layer may be less than the thickness of the first protection layer, and the modulus of the second protection layer may be less than the modulus of the first protection layer. The protection member, which includes the protection layers having different moduli, absorbs or alleviates external impact, and thus, may prevent or reduce instances of the display panel and other components arranged below the protection member from being damaged due to the impact (e.g., from dropping or external objects). Thus, the display device including the protection member according to some embodiments may exhibit the characteristics of improving the impact resistance and maintaining the reliability.

Also, the display device according to some embodiments includes the adhesive layer having the modulus less than the modulus of the second protection layer, and thus, may exhibit the characteristics of maintaining the reliability even when repeatedly folded and unfolded.

The display device according to some embodiments includes the protection member that includes the first and second protection layers having different moduli, and thus, the impact resistance may be improved.

Also, the display device according to some embodiments includes the protection member that satisfies the thickness range of the second protection layer for preventing or reducing the occurrence of buckling, and thus, the reliability may be maintained even when repeatedly folded and unfolded.

Although aspects of some embodiments of the present disclosure have been described with reference to the embodiments, it will be understood that various changes and modifications of the present disclosure may be made by one ordinary skilled in the art or one having ordinary knowledge in the art without departing from the spirit and technical field of the present disclosure as hereinafter claimed.

Hence, the technical scope of the inventive concept is to be determined by the following claims, and their equivalents, and should not be limited by the foregoing description.

What is claimed is:

1. A display device comprising:
a display panel configured to be folded about at least one folding axis; and
a protection member above the display panel,
wherein the protection member comprises:
an adhesive layer above the display panel;
a first protection layer above the adhesive layer, and having a first thickness and a first-first modulus at room temperature; and
a second protection layer between the adhesive layer and the first protection layer, and
having a second thickness less than the first thickness and a second-first modulus less than the first-first modulus at room temperature,
wherein a minimum value of the second thickness is 20 μm, and the maximum value of the second thickness satisfies Equation (1) below:

$$T2_{max} = (0.13 \times T1 - 8.25) \times \ln M2 + 0.68 \times T1 - 5.1 \tag{1}$$

wherein in Equation (1), $T2_{max}$ is the maximum value of the second thickness, T1 is the first thickness, and M2 is a second-second modulus of the second protection layer at 60° C.

2. The display device of claim 1, wherein moduli of the adhesive layer are less than moduli of the first protection layer and moduli of the second protection layer at room temperature and 60° C.

3. The display device of claim 1, wherein the second-first modulus of the second protection layer is 10 MPa to 500 MPa, and the second-second modulus is 36 MPa to 400 MPa.

4. The display device of claim 1, wherein the first-first modulus of the first protection layer is 4 GPa to 5 GPa, and the first protection layer has a first-second modulus at 60° C., and the first-second modulus is 4.2 GPa to 4.4 GPa.

5. The display device of claim 1, wherein a modulus of the adhesive layer at 60° C. is 10 KPa to 40 KPa, and a modulus at room temperature is 20 KPa to 50 KPa.

6. The display device of claim 1, wherein a thickness of the adhesive layer is 35 μm to 80 μm.

7. The display device of claim 1, wherein the first protection layer comprises at least one of polyethylene terephthalate (PET), polybutylene terephthalate (PBT), polyethylene naphthalate (PEN), polycarbonate (PC), poly methyl methacrylate (PMMA), polystyrene (PS), polyvinyl chloride (PVC), polyethersulfone (PES), polyethylene (PE), polypropylene (PP), polyamide (PA), modified-polyphenylene oxide (m-PPO), polyoxymethylene (POM), polyarylsulfones (PSU), polyphenylene sulfide (PPS), polyimide (PI), polyethylenimine (PEI), polyether ether ketone (PEEK), polyamide-imide (PAI), or polyarylate (PAR).

8. The display device of claim 1, wherein the second protection layer comprises at least one of thermoplastic polyurethane (TPU), thermoplastic polyester elastomer (TPEE), thermoplastic vulcanizate (TPV), thermoplastic olefin (TPO), thermoplastic starch (TPS), ethylene propylene rubber (EPDM), or polyether block amide (PEBA).

9. The display device of claim 1, wherein the first protection layer comprises polyethylene terephthalate, and the second protection layer comprises thermoplastic polyurethane.

10. The display device of claim 1, wherein the protection member further comprises a functional layer above the first protection layer, and the functional layer comprises at least one of an anti-fingerprint layer or a hard coating layer.

11. The display device of claim 10, wherein a modulus of the functional layer at room temperature is 2 GPa to 4 GPa.

12. The display device of claim 10, wherein a thickness of the functional layer is 5 μm to 10 μm.

13. The display device of claim 1, wherein the protection member further comprises an auxiliary adhesive layer between the first protection layer and the second protection layer, and
wherein moduli of the auxiliary adhesive layer are less than moduli of the first protection layer and moduli of the second protection layer at room temperature and 60° C.

14. The display device of claim 13, wherein the moduli of the auxiliary adhesive layer are greater than or equal to moduli of the adhesive layer at room temperature and 60° C.

15. The display device of claim 1, wherein the first thickness of the first protection layer is 65 μm to 100 μm.

16. The display device of claim 1, wherein the second thickness of the second protection layer is 20 μm to 95 μm.

17. The display device of claim 1, wherein a thickness of the protection member is 200 μm to 250 μm.

18. A display device comprising:
a display panel configured to be folded about at least one folding axis; and
a protection member above the display panel,
wherein the protection member comprises:
a first protection layer above the display panel, and having a first thickness and a first-first modulus at room temperature;
a second protection layer below the first protection layer, and having a second thickness less than the first thickness and a second-first modulus less than the first-first modulus at room temperature; and
an adhesive layer between the display panel and the second protection layer, and having a third-first modulus less than the second-first modulus at room temperature,
wherein the minimum value of the second thickness is 20 μm, and the maximum value of the second thickness satisfies Equation (1) below:

$$T2_{max}=(0.13 \times T1-8.25) \times \ln M2+0.68 \times T1-5.1 \quad (1)$$

wherein in Equation (1), $T2_{max}$ is the maximum value of the second thickness, T1 is the first thickness, and M2 is a second-second modulus of the second protection layer at 60° C.

19. The display device of claim 18, wherein the second-first modulus of the second protection layer is 10 MPa to 500 MPa, and the second-second modulus at 60° C. is 36 MPa to 400 MPa.

20. The display device of claim 18, wherein a thickness of the protection member is 200 μm to 250 μm,
the first thickness of the first protection layer is 65 μm to 100 μm,
the second thickness of the second protection layer is 95 μm or less, and
a thickness of the adhesive layer is 35 μm to 80 μm.

21. The display device of claim 18, wherein the first protection layer comprises at least one of polyethylene terephthalate (PET), polybutylene terephthalate (PBT), polyethylene naphthalate (PEN), polycarbonate (PC), poly methyl methacrylate (PMMA), polystyrene (PS), polyvinyl chloride (PVC), polyethersulfone (PES), polyethylene (PE), polypropylene (PP), polyamide (PA), modified-polyphenylene oxide (m-PPO), polyoxymethylene (POM), polyarylsulfones (PSU), polyphenylene sulfide (PPS), polyimide (PI), polyethylenimine (PEI), polyether ether ketone (PEEK), polyamide- imide (PAI), or polyarylate (PAR), and the second protection layer comprises at least one of thermoplastic polyurethane (TPU), thermoplastic polyester elastomer (TPEE), thermoplastic vulcanizate (TPV), thermoplastic olefin (TPO), thermoplastic starch (TPS), ethylene propylene rubber (EPDM), or polyether block amide (PEBA).

* * * * *